United States Patent [19]

Antonov et al.

[11] 4,159,428

[45] Jun. 26, 1979

[54] METHOD OF DIVIDING DIRECT CURRENT AMONG PARALLEL CIRCUITS AND DEVICE FOR EFFECTING SAME

[76] Inventors: Boris M. Antonov, ulitsa Mayakovskogo, 2, kv. 22, Khimki Moskovskoi oblasti; Efim I. Sluchanko, Sokolnichesky val, 22, kv. 42; Sergei I. Pischikov, Angarskaya ulitsa, 61, kv. 20, both of Moscow, all of U.S.S.R.

[21] Appl. No.: 840,797

[22] Filed: Oct. 11, 1977

[30] Foreign Application Priority Data

Oct. 11, 1976 [SU] U.S.S.R. .................. 2405000

[51] Int. Cl.² .................. H02J 1/14; H02M 3/22
[52] U.S. Cl. .................. 307/32; 323/75 A
[58] Field of Search .................. 307/11, 30, 31, 32; 323/75 A, 75 E; 363/60

[56] References Cited

U.S. PATENT DOCUMENTS

| | | | |
|---|---|---|---|
| 2,773,200 | 12/1956 | Guggi .................. | 323/75 A |
| 3,344,331 | 9/1967 | Adler .................. | 323/75 E |
| 3,751,676 | 8/1973 | Igarashi .................. | 307/31 |
| 3,839,666 | 10/1974 | Kitaev .................. | 363/60 |

OTHER PUBLICATIONS

Japanese Publication identified as No. 47-51124, published 1972.
"Mercury Rectifier and Solid State Substations", A. M. Semichinov, Publisher, Energy, 1968, Russia

*Primary Examiner*—L. T. Hix
*Assistant Examiner*—S. D. Schreyer
*Attorney, Agent, or Firm*—Lackenbach, Lilling & Siegel

[57] ABSTRACT

A method of dividing direct current among parallel circuits, whereby the direct current in each parallel circuit is converted into an alternating current at equipotential sections of each parallel circuit, a compensating voltage equal to half the difference between the voltage drops across two neighboring parallel circuits under steady-state conditions and at equality of the direct current therein is produced at each equipotential section, and the compensating voltage is introduced into each parallel circuit in opposition to or in accordance with the circuit e.m.f. The device contains current-equalizing units equal in number to the number of parallel circuits, each having a bridge circuit made up four controlled switches; and capacitors coupled to the points of connection of the controlled switches so as to close the circuit.

4 Claims, 2 Drawing Figures

METHOD OF DIVIDING DIRECT CURRENT AMONG PARALLEL CIRCUITS AND DEVICE FOR EFFECTING SAME

Fields of the Invention

This invention relates to electrical devices and, more particularly to a method of dividing direct current among parallel circuits and a device for effecting same.

The invention may be employed in device for distributing power or current among parallel circuits, for instance, while simultaneously charging several storage batteries, supplying a number of galvanoplastic or electrolytic baths, and for dividing direct current among the electrodes of a multielectrode magnetohydrodynamic generator and in other similar electrochemical, power and electrical devices.

Description of the Prior Art

The known methods of dividing direct current among parallel circuits are based on compensating for the difference in voltage drops across the parallel circuits by various means.

For instance, the difference in voltage drops for different currents in the case of parallel operation of rectifier sets connected to a common load is compensated for by varying the rectifier e.m.f.

When dividing a periodically pulsating intermittent current among the parallel circuits of rectifier cells, the voltage drops across the parallel circuits are compensated for by introducing an e.m.f. produced by magnetic elements into each circuit. This method can be implemented only through the use of iron-core choke coils and is therefore unsuitable for dividing a continuous direct current.

Another known method of dividing direct current among parallel circuits is based on compensation for the difference of voltage drops due to direct current by introducing an additional compensating voltage proportional to the direct current in each parallel circuit.

As a result, a counter—e.m.f. is induced in the system.

The device for effecting this method contains current-equalizing units equal in number to the parallel circuits and linking those circuits. The current-equalizing units are made of resistors. A disadvantage of the above method and of the device for carrying it out is its rather low efficiency due to the considerable ohmic losses caused by the introduction of the counter—e.m.f. Moreover, as the accuracy of current division depends on the relationship between the additional compensating voltage and the voltage drop across the parallel circuit, it is increased by increasing the additional compensating voltage at the cost of increasing the value of the resistors of the current-equalizing units.

Such a solution of the problem is unsuitable for most electric circuits, as the insertion of resistors into high-capacity power circuits considerably worsens the efficiency thereof requires the employment of a more sophisticated system of cooling.

SUMMARY OF THE INVENTION

It is an object of the present invention to provide a method of dividing direct current among parallel circuits and a device for effecting same of a sufficiently high efficiency so as to exceed appreciably that of the device with resistors.

Another object of the invention is to improve the accuracy of division of direct current among parallel circuits.

These and other objects are attained by a method of dividing direct current among parallel circuits based on compensation for the difference of voltage drops caused by the direct current in each parallel circuit by introducing a compensating voltage proportional to the direct current in each parallel circuit. The method consists of, in accordance with the invention, converting the direct current in each parallel circuit into an alternating current at equipotential sections of each parallel circuit, producing an additional compensating voltage equal to half the difference between the voltage drops across two neighbouring parallel circuits under steady-state conditions and at equality of the direct current therein at each equipotential section, and introducing the additional compensating voltage into each parallel circuit every half-cycle of the working frequency in opposition to or in accordance with the circuit e.m.f.

The objects of the invention are accomplished by a device for effecting this proposed method, wherein the parallel d.c. circuits are interlinked by current-equalizing units equal in number to the member of parallel circuits. In accordance with the invention, each current-equalizing unit comprises four controlled switches forming a bridge circuit, the diagonal whereof contains a parallel circuit, while the points of connection of the controlled switches being coupled via capacitors to similar points of connection of the controlled switches of the neighbouring bridges, thus closing the circuit.

It is preferable, in the case of two parallel circuits, to couple the points of connection of the controlled switches of one of the legs of the first bridge, through capacitors, to the points of connection of the controlled switches on the corresponding leg of the second bridge circuit.

BRIEF DESCRIPTION OF THE DRAWINGS

The above and other objects, features and advantages of the present invention will be more fully understood from the following description with reference to specific embodiments thereof, taken in conjunction with the accompanying drawings, wherein.

DETAILED DESCRIPTION OF THE INVENTION

Figure 1:
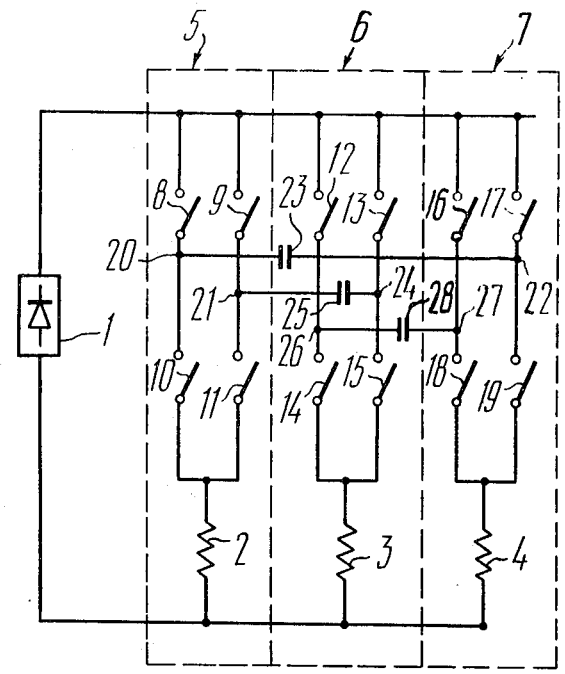
FIG. 1 is an electrical, schematic diagram of a device for dividing direct current among three parallel circuits, in accordance with the present invention.

The device for dividing the direct current of a power supply 1 (FIG. 1) among three parallel circuits containing individual loads 2,3 and 4 comprises three current-equalizing units 5,6 and 7 coupled to the loads 2,3 and 4, said units always being equal in number to the number of parallel circuits among which the current of the power supply is divided. Each current-equalizing unit 5,6 and 7 is essentially a bridge circuit made up of four controlled switches 8,9,10 and 11; 12,13,14 and 15; and 16,17,18 and 19, respectively. One of the nodes of the bridge circuit is connected to the power supply 1 and the other node is connected to a respective load 2, 3 or 4, the other lead of the load being connected to the other terminal of the power supply. The points of connection 20 and 21 of the switches 8 and 10 and 9 and 11, respectively, of the first bridge circuit are respectively coupled to the point 22 of connection of the switches 17 and 19 of the third bridge circuit through a capacitor 23 and to the point 24 of connection of the switches 13 and 15 of the second bridge circuit through a capacitor 25. The point 26 of connection of the switches 12 and 14 of the second bridge circuit is coupled to the point 27 of connection of the switches 16 and 18 of the third bridge circuit through a capacitor 28. This makes up a closed circuit containing the capacitors 23,25 and 28 connected to the legs of the bridge circuits.

Figure 2:
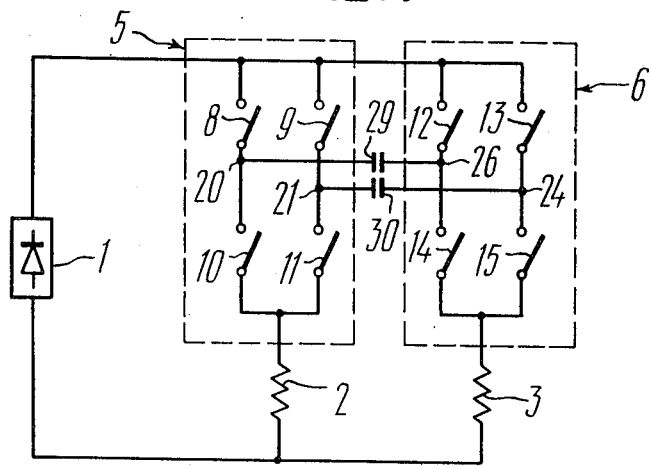
FIG. 2 is an electrical, schematic diagram of a device for dividing direct current among two parallel circuits, in accordance with the present invention.

In cases where the direct current of the power supply 1 is divided between two parallel circuits as shown in FIG. 2, the points 20 and 21 of connection of the switches 8 and 10 and 9 and 11, respectively, of the first bridge circuit are respectively coupled to similar points 26 and 24 of connection of the switches 12 and 14 and 13 and 15 of the second bridge circuit through capacitors 29 and 30, respectively.

The proposed device operates as follows:

The switches 8–19 forming the bridge circuits are controlled by any known method. The current of each load 2–4 flows through the capacitors 23,25 and 28. Consider the operation of the device with reference to the circuit diagram shown in FIG. 2, assuming that the load 2 is greater than the load 3.

Switches 12 and 10 and 9 and 15 are closed during the first half-cycle of the working frequency. As a result, the load 2 is connected to the source of supply 1 through the capacitor 29, and the load 3 is connected to the power supply 1 through the capacitor 30. In the course of that period of time, the capacitors 29 and 30 are charged to different levels of voltage though they are of the same capacitance. Since the load 2 is greater than the load 3, the capacitor 29 becomes charged to a higher voltage. In the next half-cycle, the switches 11 and 13 and 14 and 8 are closed, and the switches 12 and 10 and 9 and 15 are opened. As a consequence, the load 2 is connected to the power supply 1 through the capacitor 30, and the load 3 is connected to the power supply 1 through the capacitor 29.

The load current 3 cannot fully recharge the capacitor 29, as it is smaller than the load current 2 that charged the capacitor 29 in the course of the previous half-cycle, whereas the capacitor 30 acquires an additional charge in the circuit of the load 2.

Then, the capacitors are switched over again, the capacitor 29 is connected once more to the load 2 with its plate voltage opposing the rise in load current 2, while the capacitor 30 is connected to the load 3 with its plate voltage contributing to the rise in load current 3.

Under steady-state conditions, the difference in the loads 2 and 3 produces an additional compensating voltage across the capacitors 29 and 30 equal to half the difference between the voltage drops in those circuits.

The device with three circuits operates basically in the same way as the device with two circuits. The difference is due to the number of parallel circuits being more than two. In this case, the linkage between two of the loads is brought about by a single one of the capacitors 23, 25, and 28 shown in FIG. 1. Thus, the capacitor 23 operates in the circuits of the loads 2 and 4, the capacitor 25 operates in the circuits of the loads 2 and 3 and the capacitor 28 operate in the circuits of the loads 3 and 4 and they equalize the currents in each of the pairs. Since the capacitors form a closed ring, each of the parallel circuits carries an equal current.

The resistor-type Hall e.m.f. compensators used up till now to add the electrode currents of magnetohydrodynamic generators cause an energy loss amounting to 4 percent of the energy given up by the generator to the industrial power supply mains. The proposed device has an efficiency of about 96 percent and reduces the energy losses approximately 100 times.

Moreover, the proposed device ensures even distribution of the current among the electrodes for any polarity of the voltage difference across the electrodes and any voltage variation, a feature absent in resistor-type compensators.

In the case of resistor-type compensators, the practically attained accuracy of division of the added currents among electrodes does not exceed 20 percent under duty conditions closely approaching calculated conditions. The proposed device increases the accuracy of current division up to 1 percent, i.e. improves the accuracy nearly 20-fold.

This high accuracy of division of currents among electrodes, providing for practically complete elimination of current components due to Hall e.m.f.'s, is achieved without the use of any system of automatic control, thus considerably simplifying the present device.

What is claimed is:

1. A method of dividing direct current among parallel circuits, comprising the steps of converting the direct current in each parallel circuit into an alternating current at equipotential sections of each parallel circuit; producing a compensating voltage equal to half the difference between the voltage drops across two neighboring parallel circuits under steady-state conditions and at equality of the direct current therein at each equipotential section; and introducing the compensating voltage into each parallel circuit in opposition to or in accordance with the circuit e.m.f. to compensate for the difference in the voltage drops due to direct current in each parallel circuit.

2. A device for dividing direct current among parallel circuits comprising: current-equalizing units equal in number to the number of parallel circuits, each of said current-equalizing units comprising four controlled switches interconnected to form a bridge circuit, a first node of said bridge circuit being connected to a first terminal of a power supply, a second node of said bridge being connected to a first lead of a load of a respective circuit, a second lead of said load of said respective circuit being connected to a second terminal of said power supply; and capacitors equal in number to the number of parallel circuits, each of said capacitors connecting a connecting point of said controlled switches of one of the legs of one of the bridge circuits to a connecting point of said controlled switches of a corresponding leg of an adjacent bridge circuit.

3. A device for dividing direct current according to claim 2, wherein there are three parallel circuits and a first capacitor connects a connecting point of said controlled switches of a first leg of a first bridge circuit to a connecting point of said controlled switches of a second leg of a third bridge circuit, a second capacitor connects a connecting point of said controlled switches of a second leg of said first bridge circuit to a connecting point of said controlled switches of a second leg of a second bridge circuit, and a third capacitor connects a connecting point of said controlled switches of a first leg of said second bridge circuit to a connecting point of said controlled switches of a first leg of said third bridge circuit.

4. A device for dividing direct current according to claim 2, wherein there are two parallel circuits and a first capacitor connects a connecting point of said controlled switches of a first leg of a first bridge circuit to a connecting point of said controlled switches of a first leg of a second bridge circuit, and a second capacitor connects a connecting point of said controlled switches of a second leg of said first bridge circuit to a connecting point of said controlled switches of a second leg of said second bridge circuit.

* * * * *